US007847669B2

(12) United States Patent
Ayazi et al.

(10) Patent No.: US 7,847,669 B2
(45) Date of Patent: Dec. 7, 2010

(54) MICRO-ELECTROMECHANICAL SWITCHED TUNABLE INDUCTOR

(75) Inventors: Farrokh Ayazi, Atlanta, GA (US); Mina Raieszadeh, Atlanta, GA (US); Paul A. Kohl, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 28 days.

(21) Appl. No.: 11/999,527

(22) Filed: Dec. 6, 2007

(65) Prior Publication Data

US 2008/0136572 A1 Jun. 12, 2008

Related U.S. Application Data

(60) Provisional application No. 60/868,810, filed on Dec. 6, 2006.

(51) Int. Cl.
*H01F 5/00* (2006.01)
*H01F 27/28* (2006.01)
*H01F 21/02* (2006.01)
*H01F 21/10* (2006.01)
*H01G 2/00* (2006.01)
*H01G 5/00* (2006.01)

(52) U.S. Cl. ....................... 336/200; 336/223; 336/232; 336/146; 336/222; 336/87; 361/272; 361/287

(58) Field of Classification Search ....................... None
See application file for complete search history.

(56) References Cited

U.S. PATENT DOCUMENTS 4,249,262 A * 2/1981 Fenk .......................... 455/333
5,578,976 A * 11/1996 Yao ............................ 333/262
5,872,489 A * 2/1999 Chang et al. ................ 331/179
5,959,516 A * 9/1999 Chang et al. .................. 334/14
6,232,847 B1 * 5/2001 Marcy et al. ................ 331/167
6,549,096 B2 4/2003 Groves et al.

(Continued)

OTHER PUBLICATIONS

James Salvia et al, “Tunable on-Chip Inductors up to 5 GHz using patterned permalloy Laminations,”Dec. 2005 IEEE IEDM, pp. 943-946.
Shih et al, “Tunable solenoid microinductors utilizing Permalloy electro-thermal vibromotors,” Sep. 2004 IEEE MEMS, pp. 793-796.

(Continued)

*Primary Examiner*—Elvin G Enad
*Assistant Examiner*—Mangtin Lian
(74) *Attorney, Agent, or Firm*—Thomas, Kayden, Horstemeyer & Risley, LLP

(57) ABSTRACT

Disclosed is an integrated tunable inductor having mutual micromachined inductances fabricated in close proximity to a tunable inductor that is switched in and out by micromechanical ohmic switches to change the inductance of the integrated tunable inductor. To achieve a large tuning range and high quality factor, silver is preferably used as the structural material to co-fabricate the inductors and micromachined switches, and silicon is selectively removed from the backside of the substrate. Using this method, exemplary tuning of 47% at 6 GHz is achievable for a 1.1 nH silver inductor fabricated on a low-loss polymer membrane. The effect of the quality factor on the tuning characteristic of the integrated inductor is evaluated by comparing the measured result of substantially identical inductors fabricated on various substrates. To maintain the quality factor of the silver inductor, the device may be encapsulated using a low-cost wafer-level polymer packaging technique.

22 Claims, 8 Drawing Sheets

U.S. PATENT DOCUMENTS

| | | | | |
|---|---|---|---|---|
| 6,573,822 | B2 * | 6/2003 | Ma et al. | 336/223 |
| 6,768,628 | B2 * | 7/2004 | Harris et al. | 361/277 |
| 6,800,912 | B2 * | 10/2004 | Ozgur | 257/414 |
| 6,977,569 | B2 * | 12/2005 | Deligianni et al. | 335/78 |
| 7,042,319 | B2 * | 5/2006 | Ishiwata et al. | 335/78 |
| 7,091,784 | B1 | 8/2006 | Terrovitis | |
| 7,598,838 | B2 * | 10/2009 | Hargrove et al. | 336/200 |
| 2002/0190835 | A1 * | 12/2002 | Ma et al. | 336/223 |
| 2003/0030527 | A1 * | 2/2003 | Mhani et al. | 336/130 |
| 2003/0060051 | A1 * | 3/2003 | Kretschmann et al. | 438/694 |
| 2003/0099082 | A1 * | 5/2003 | Tuo et al. | 361/290 |
| 2003/0122207 | A1 * | 7/2003 | Yen et al. | 257/421 |
| 2004/0100341 | A1 * | 5/2004 | Luetzelschwab et al. | 333/32 |
| 2005/0068146 | A1 * | 3/2005 | Jessie | 336/200 |
| 2006/0115919 | A1 * | 6/2006 | Gogoi et al. | 438/50 |
| 2006/0290450 | A1 * | 12/2006 | Weller et al. | 333/262 |
| 2006/0290457 | A1 * | 12/2006 | Lee et al. | 336/200 |
| 2007/0273013 | A1 * | 11/2007 | Kohl et al. | 257/682 |

OTHER PUBLICATIONS

C. M. Tassetti et al., "Tunable RF MEMS microinductors for future communication systems," Sep. 2003 IEEE MTT-S, vol. 3, pp. 541-545.

I. Zine-El-Abidine et al., "RF MEMS tunable inductor," 2004 IEEE Microwaves, Radar and Wireless Corn., vol. 3, pp. 817-819, May 2004.

P. Monajemi et al, "A Low-cost Wafer-level Packaging Technology," 2005 IEEE MEMS, Jan. 2005, pp. 634-637.

M. Rais-Zadeh et al, "High-Q Micromachined Silver Passives and Filters," accepted to IEEE IEDM, Dec. 2006.

M. Rais-Zadeh et al., "Characterization of high-Q sprial inductors on thick insulator-on-silicon" J. of Micromechanics and Microengineering (Sep. 2005) vol. 15 pp. 2105-2112.

M. Raieszadeh et al., "High-Q integrated inductors on trenched Si islands" Proc. of IEEE MEMS Conf. (Jan. 2005) pp. 199-202.

R. Manepalli et al., "Silver metallization for advanced interconnects" IEEE Trans. Advanced Packaging (Feb. 1999) vol. 22 No. 1 pp. 4-8.

* cited by examiner

Fig. 1
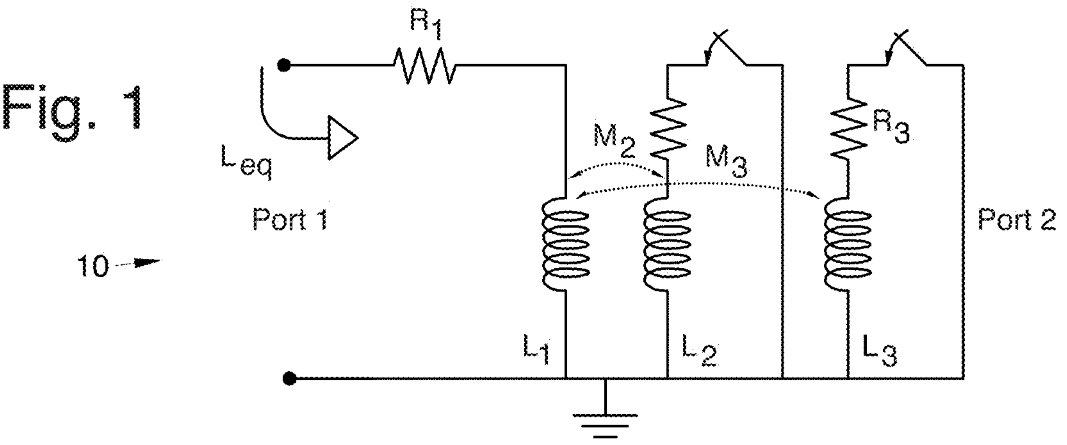
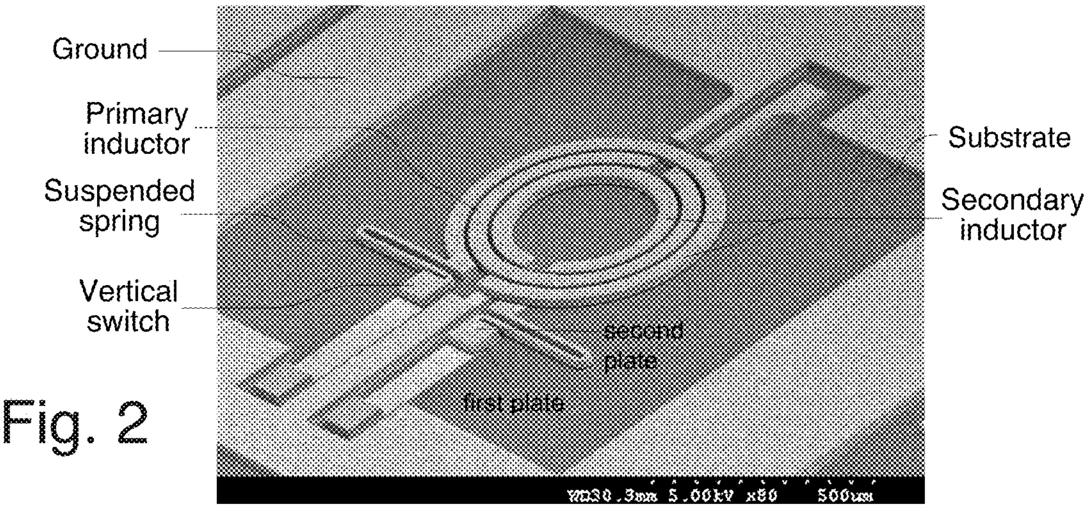
Fig. 2
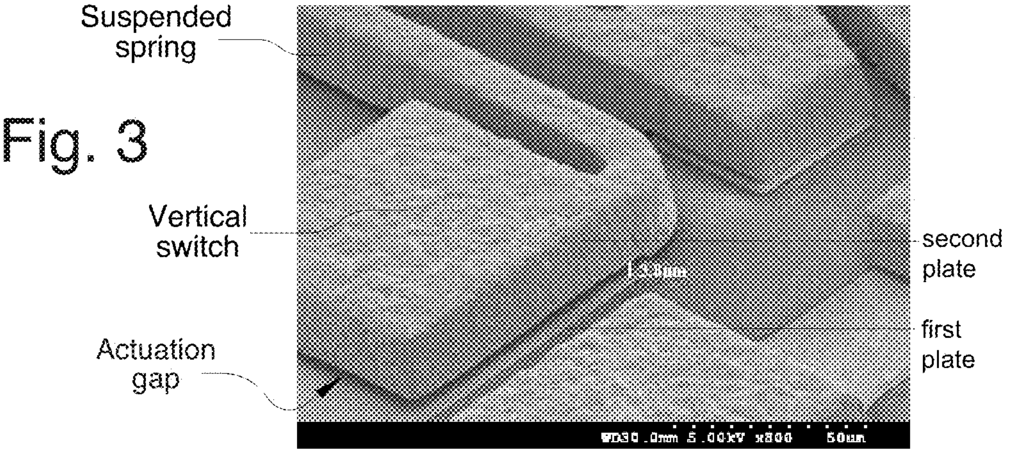
Fig. 3

MICRO-ELECTROMECHANICAL SWITCHED TUNABLE INDUCTOR

CROSS REFERENCE TO RELATED APPLICATIONS

This application claims priority to U.S. provisional application entitled "Micromachined Switched Tunable Inductor" having Ser. No. 60/868,810, filed Dec. 6, 2006.

STATEMENT REGARDING FEDERALLY SPONSORED RESEARCH OR DEVELOPMENT

This invention was made with government support under agreement ECS-0348286 awarded by the National Science Foundation. The Government has certain rights in the invention.

BACKGROUND

The present invention relates generally to tunable inductors, and more particularly, to microelectromechanical systems (MEMS) switched tunable inductors.

Tunable inductors can find application in frequency-agile radios, tunable filters, voltage controlled oscillators, and reconfigurable impedance matching networks. The need for tunable inductors becomes more critical when optimum tuning or impedance matching in a broad frequency range is desired. Both discrete and continuous tuning of passive inductors using micromachining techniques have been reported in the literature.

Discrete tuning of inductors is usually achieved by changing the length or configuration of a transmission line using micromachined switches. The incorporation of switches in the body of the tunable inductor increases the resistive loss and hence reduces the quality factor (Q). Alternatively, continuous tuning of inductors may be realized by displacing a magnetic core, changing the permeability of the core, or using movable structures with large traveling range. Although significant tuning has been reported using these methods, the fabrication or the actuation techniques are complex, making the on-chip implementation of the tunable inductors difficult. In addition, Q of the reported tunable inductors is not sufficiently high for many wireless and RF integrated circuit applications.

Therefore, there is a need for high-performance small form-factor tunable inductors. Also, to overcome the shortcomings of prior art tunable inductors, an improved design and micro-fabrication method for tunable inductors is necessary.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates an electrical model of an exemplary switched tunable inductor;

FIG. 2 is a SEM view of a 20 μm thick silver switched tunable inductor fabricated on an Avatrel™ polymer membrane;

FIG. 3 is a close-up SEM view of the switch, showing the actuation gap;

FIG. 7 illustrates measured inductance showing a maximum tuning of 47% at 6 GHz when both inductors are on;

DETAILED DESCRIPTION

Figure 4A:
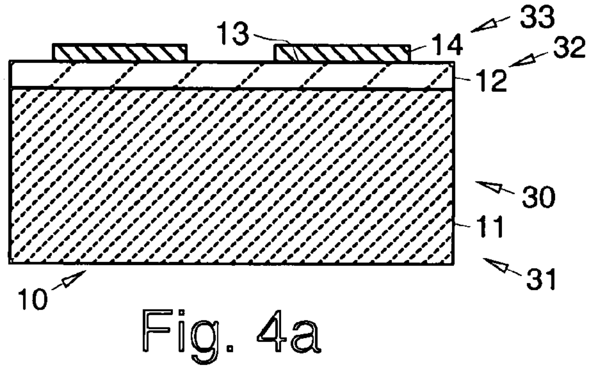
FIGS. 4*a-h* illustrate an exemplary method for fabricating a packaged switched tunable inductor.
Figure 4B:
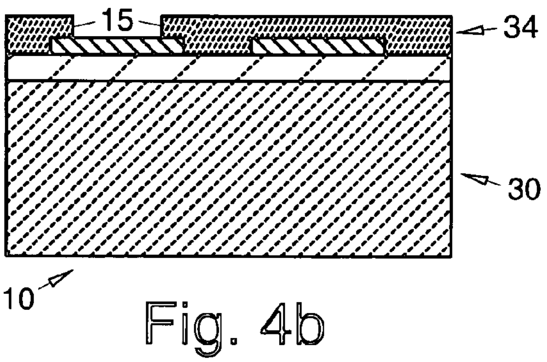
Figure 4C:
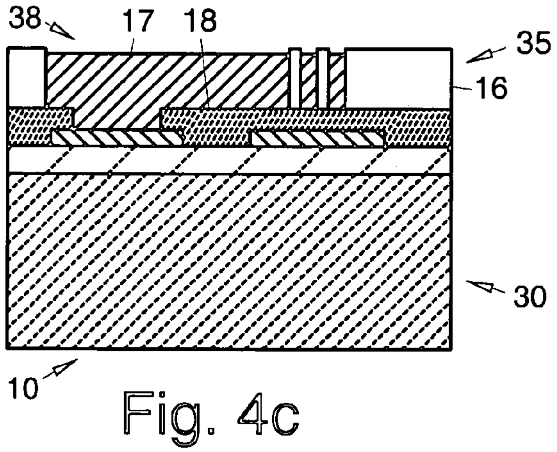
Figure 4D:
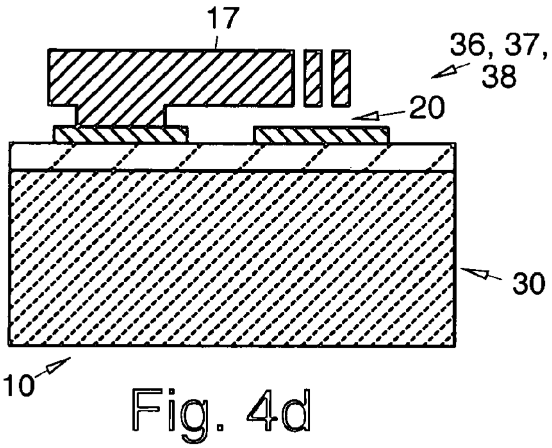
Figure 4D:
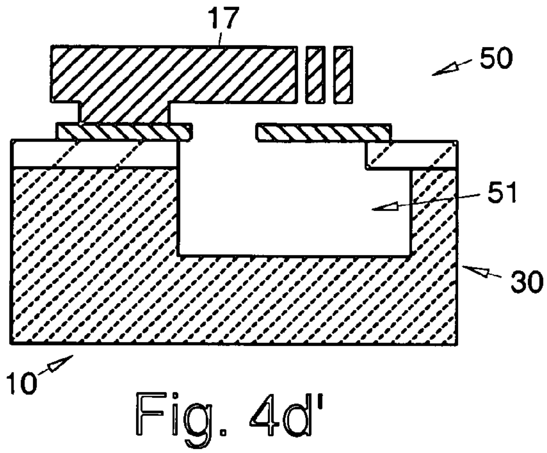

Disclosed are small form-factor high-Q switched tunable inductors 10 for use in a frequency range of about 1-10 GHz. In this frequency range, the permeability of most magnetic materials degrades, making them unsuitable for use at low RF frequencies. Also, small displacement is preferred to simplify the encapsulation process of the tunable inductors 10. Tunable inductors 10 are disclosed based on transformer action using on-chip micromachined vertical switches with an actuation gap of a few micrometers. Silver (Ag) is preferably used since it has high electrical conductivity and low Young's modulus compared with other metals. To encapsulate the tunable inductors 10, a wafer-level polymer packaging technique or method 30 (FIG. 4) is employed. The fabrication method 30 is simple and requires only six lithography steps, including packaging steps, and is post-CMOS compatible. Using this method 30, a reduced-to-practice 1.1 nH silver tunable inductor 10 is switched to four discrete values and shows a maximum tuning of 47% at 6 GHz. This inductor 10 exhibits an embedded Q in the range of 20 to 45 at 6 GHz and shows no degradation in Q after packaging. The disclosed switched tunable inductor 10 outperforms reported tunable inductors with respect to its high embedded quality factor at radio frequencies.

Design

FIG. 1 shows a schematic view of an exemplary switched tunable inductor 10. The inductance is taken from port one, and a plurality of inductors at port two (secondary inductors) are switched in and out (two inductors in this case). Inductors may be one-turn or multi-turn having spiral or solenoid configurations and the switches are micromachined. Inductors at port two are different in size, and thus have a different mutual inductance effect on port one when activated. The effective inductance of port one can have 1+n(n+1)/2 different states, where n is the number of inductors at port two. In the case of two inductors at port two, four discrete values can be achieved.

The equivalent inductance and series resistance seen from port one are found from $$L_{eq} = L_1\left(1 - \sum_{i=2}^{n+1} \frac{b_i k_i^2 L_i^2 \omega^2}{R_i^2 + L_i^2 \omega^2}\right) \quad b_i = 0 \text{ or } 1 \tag{1}$$

$$R_{eq} = R_1 + \sum_{i=2}^{n+1} \frac{b_i R_i k_i^2 L_1 L_i \omega^2}{R_i^2 + L_i^2 \omega^2} \quad b_i = 0 \text{ or } 1 \tag{2}$$

where $L_1$ is the inductance at port one; $L_i$ is the inductance value of the secondary inductors; $R_i$ represents the series resistance of each secondary inductor plus the contact resistance of its corresponding switch; $k_i$ is the coupling coefficient; $b_i$ represents the state of the switch and is 1 (or 0) when the switch is on (or off), and $\omega$ is the angular frequency.

In equations (1) and (2), the parasitic capacitances are not considered. If the parasitic capacitances are taken into account, it can be shown that the equivalent inductance seen from port one when all of the switches at port two are open ($L_{eq(off\text{-}state)}$) is given by $$L_{eq(off-state)} = L_1\left(1 + \sum_{i=1}^{n+1} k_i^2 \frac{1 - \frac{\omega^2}{\omega_{SRi}^2}}{\frac{\omega^2}{Q_i^2 \omega_{SRi}^2} - 2 + \frac{\omega^2}{\omega_{SRi}^2} + \frac{\omega_{SRi}^2}{\omega^2}}\right) \tag{3}$$

where $Q_i = L_i\omega/R_i$ is the quality factor of the secondary inductors; $\omega_{SRi}$ is defined as $$\omega_{SRi} = \frac{1}{\sqrt{L_i(C_i + C_{swi})}} \tag{4}$$

where $C_i$ denotes the self-capacitance of each inductor and $C_{swi}$ is the off-state capacitance of its associated switch. If secondary inductors are high Q and have a resonance frequency much larger than the operating frequency ($\omega \ll \omega_{SRi}$), $L_{eq(off\text{-}state)}$ can be approximated by $$L_{eq(off-state)} \overset{\omega \ll \omega_{SRi}}{\approx} L_1\left(1 + \sum_{i=1}^{n+1} k_i^2 \frac{\omega^2}{\omega_{SRi}^2 - 2\omega^2}\right) \approx L_1 \tag{5}$$

In this case, the largest change in the effective inductance occurs when all switches at port two are on and the percentage tuning can be found from $$\%\ \text{tuning} = \sum_{i=2}^{n+1} \frac{b_i k_i^2 L_i^2 \omega^2}{(R_i^2 + L_i^2 \omega^2)} \times 100 \tag{6}$$

From equations (5) and (6) it can be seen that to achieve large tuning, $R_i$ should be much smaller than the reactance of the secondary inductors ($L_i\omega$), which requires high-Q inductors and low-contact resistance switches that are best implemented using micromachining technology. For this reason, as disclosed herein, silver, which has the highest electrical conductivity of all materials at room temperature, is used to co-implement high-Q inductors and micromachined ohmic switches using a low-temperature fabrication process. The switches are actuated by applying a DC voltage to port two. The use of silver also offers the advantage of having a smaller tuning voltage compared to the other high conductivity metals (e.g., copper) because of its lower Young's modulus. However, it is to be understood that the disclosed switched tunable inductors can be made of other metals such as gold and/or copper at the expense of lower quality factor and smaller tuning range.

Figure 15A:
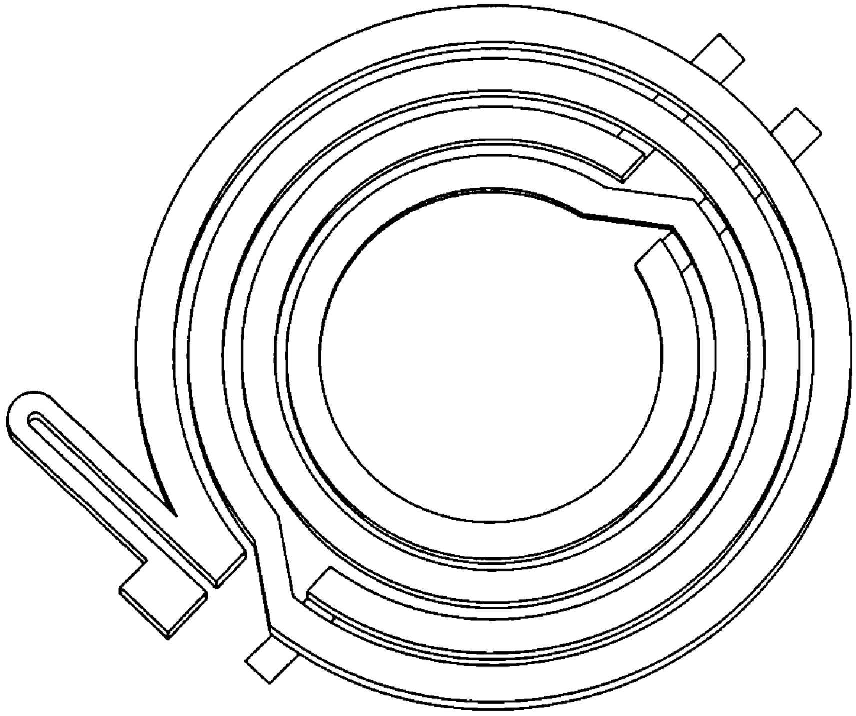
FIGS. 15*a* and 15*b* illustrate exemplary multi-turn inductors in accordance with the current disclosure.
Figure 15B:
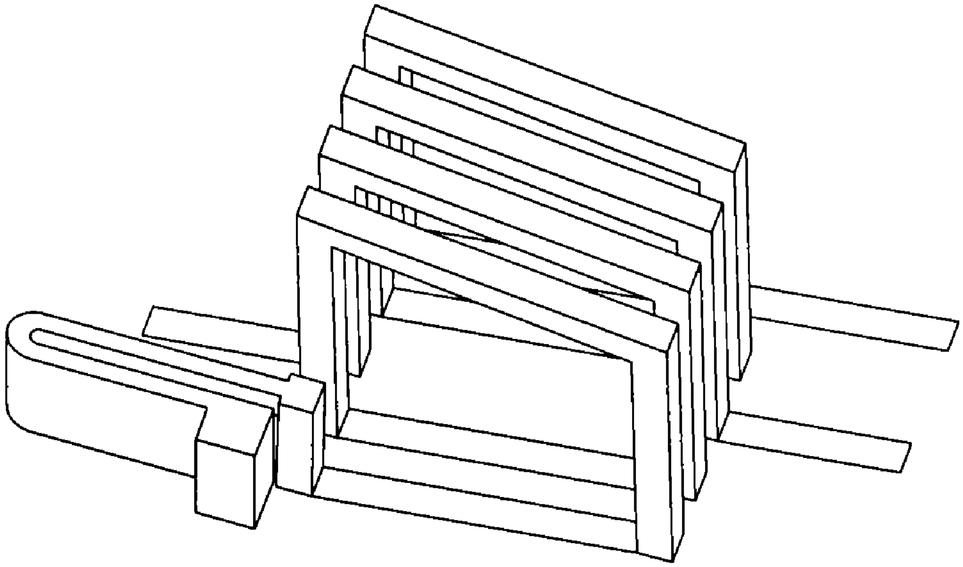

FIG. 2 shows a scanning electron microscope (SEM) view of a silver switched tunable inductor 10. The inductors at port two are in series connection with a micromachined vertical ohmic switch through a narrow spring as illustrated in the schematic view of FIG. 1. The two vertical switches of FIG. 2 include first and second plates. Inductors may be one turn as illustrated in FIG. 2 or multi-turn as illustrated in FIGS. 15*a* and 15*b*. FIG. 15*a* illustrates an exemplary embodiment of a planar spiral multi-turn inductor. FIG. 15*b* illustrates an exemplary embodiment of an out-of-plane solenoid inductor. Springs are designed to have a small series resistance and stiffness. The actuation voltage of the vertical switch with an actuation gap of 3.8 μm is 40 V. This voltage can be reduced to less than 5 V by reducing the gap size to ~0.9 μm. A close-up view of the switch showing the actuation gap is shown in FIG. 3.

Fabrication

A schematic diagram illustrating the process flow of an exemplary fabrication method 30 for producing an exemplary inductor 10 is shown in FIGS. 4*a-h*. A substrate 11 is provided 31. The substrate 11 is spin-coated 32 with a thick low-loss dielectric 12 such as polymer 12 (20 μm in this case), such as Avatrel™ (available from Promerus, LLC, Brecksville, Ohio), for example. A routing metal layer 14 is formed 33 by evaporating a thick silver layer 14 (2 μm in this case), for example. A thin adhesion layer 13 (~100 A°) such as titanium (Ti), for example, may be used to promote the adhesion between the routing metal layer 14 (silver layer 14) and the polymer layer 12. An actuation gap 20 is then defined by depositing 34 a layer of plasma enhanced chemical vapor deposited (PECVD) sacrificial silicon dioxide layer 15 at 160° C. (3.8 μm thick in this case). The deposition temperature of silicon dioxide layer 15 was reduced to preserve the quality of the polymer layer 12, which provides mechanical support for the released device. Inductors and switches are formed 35 by electroplating silver 17 into a photoresist mold 16 (20 μm thick in this case). A thin layer 18 of Ti/Ag/Ti (100 A°/300 A°/100 A°) is sputter deposited to serve as a seed layer 18 for plating. The top titanium layer of the seed layer 18 prevents the electroplating of silver 17 underneath the electroplating mold 16, and may be dry etched from open areas in a reactive ion etching system (RIE). The use of the titanium layer is important when the distance between the silver lines is less than 10 μm.

An exemplary plating bath consists of 0.35 mol/L of potassium silver cyanide (KAgCN) and 1.69 mol/L of potassium cyanide (KCN). A current density of 1 mA/cm$^2$ may be used in the plating process. The electroplating mold 16 is subsequently removed 36. The seed layer 18 may be removed 37 using a combination of wet and dry etching processes. Compared to sputtered silver, the electroplated silver layer 17 has a larger grain size resulting in a higher wet etch rate using an $H_2O_2$:$NH_4OH$ solution. The hydrogen peroxide oxidizes the silver and the ammonium hydroxide solution complexes and dissolves the silver ions. When wet etched, the thick high-aspect ratio lines of electroplated silver 17 etch much faster than the sputtered seed layer 18 that is between the walls of thick electroplated silver 17. Dry etching silver on the other hand, decouples the oxidation and dissolution steps resulting in almost the same removal rate for the small-grained sputtered layer 18 as the large-grained plated silver 17. The silver is first oxidized in an oxygen plasma (dry etch) and then the resultant silver oxide layer is dissolved in dilute ammonium hydroxide solution. Using this etching method, the seed layer 18 is removed 37 without losing excess electroplated silver 17. The device 10 is then released 38 in dilute hydrofluoric acid.

Figure 4E:
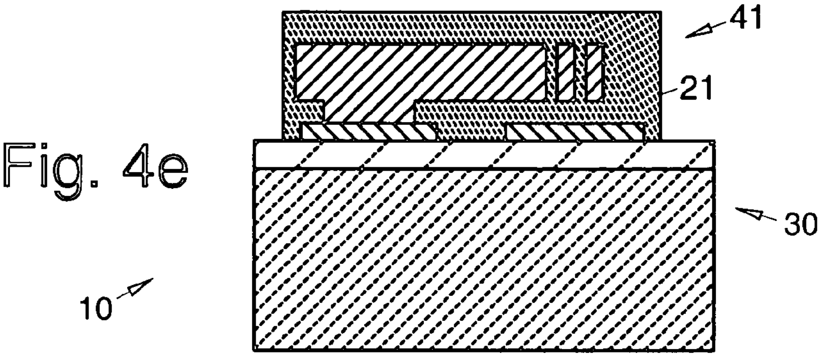
Figure 4F:
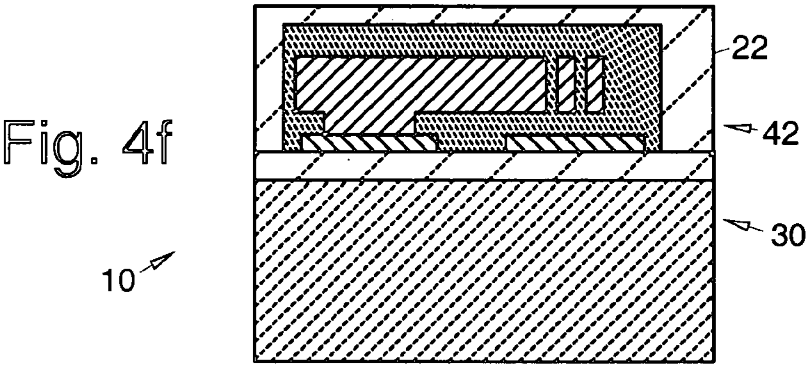
Figure 4G:
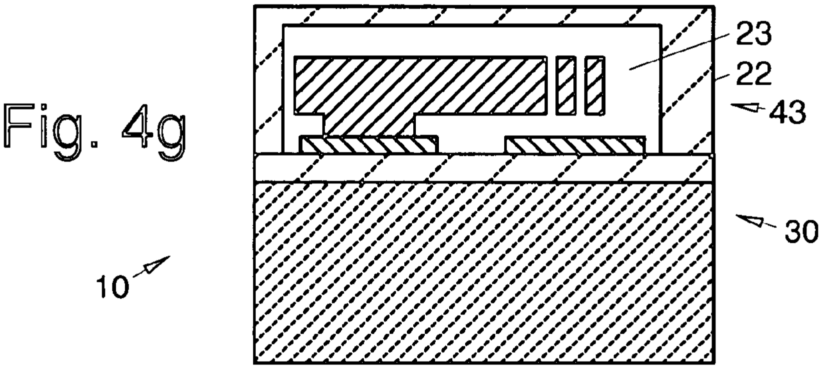
Figure 4H:
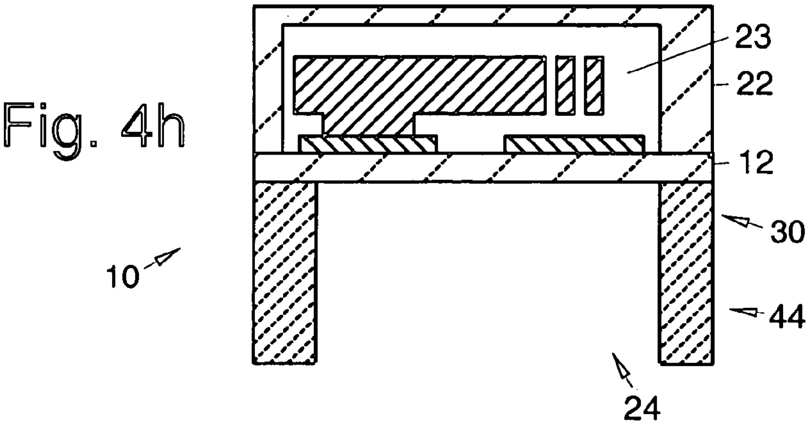
Figure 5:
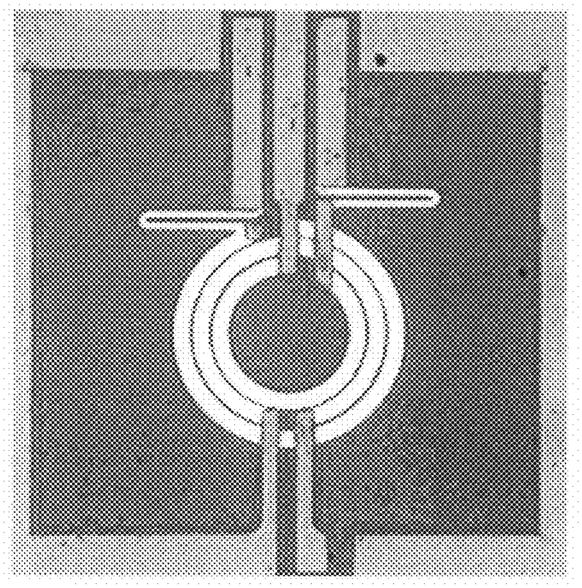
FIG. 5 is a micrograph of the switched silver inductor taken from the backside of the Avatrel™ membrane.

The released device 10 is then wafer-level packaged 41-43 (FIGS. 4*e*-4*g*). This may be done as disclosed by P. Monajemi, et al., in "A low-cost wafer-level packaging technology," *IEEE International Conference on Microelectromechanical Systems*, Miami, Fla. January 2005, pp. 634-637, for example. A thermally-decomposable sacrificial polymer 21, Unity® (available from Promerus LLC, Brecksville, Ohio, 44141), is applied and patterned 41 (FIG. 4*e*). Then, the over-coat polymer 22 (Avatrel™), which is thermally stable at the decomposition temperature of the decomposable sacrificial polymer 21, is spin-coated and patterned 42 (FIG. 4*f*). Finally, the sacrificial polymer 21 is decomposed 43 at 180° C. (FIG. 4*g*). As discussed in the P. Monajemi, et al. paper, the resulting gaseous products diffuse out through a solid Avatrel™ over-coat 22 with no perforations. The loss caused by the silicon substrate 11 may be eliminated, if necessary, by selective backside etching 44 (FIG. 4*h*), to form an optional backside cavity 24, leaving a polymer membrane 12 under the device 10. Alternatively, the loss caused by the silicon substrate 11 may be eliminated, if necessary, by selective etching 50 of the substrate before encapsulating the device (FIG. 4*d'*), to form an optional cavity 51 under the device 10. A micrograph of an un-packaged inductor taken from the backside of the Avatrel™ polymer membrane 12 is shown in FIG. 5. The highest processing temperature, including the packaging steps, is 180° C. and thus the process is post-CMOS compatible.

Regarding materials that may be employed to fabricate the inductor 10, the substrate 11 may be silicon, CMOS, BiCMOS, gallium arsenide, indium phosphide, glass, ceramic, silicon carbide, sapphire, organic or polymer. The dielectric layer 12 may be silicon dioxide, silicon nitride, hafnium dioxide, zirconium oxide or low-loss polymer. The conductive layers may be polysilicon, silver, gold, aluminum, nickel or copper.

Simulation Results

Figure 6A:
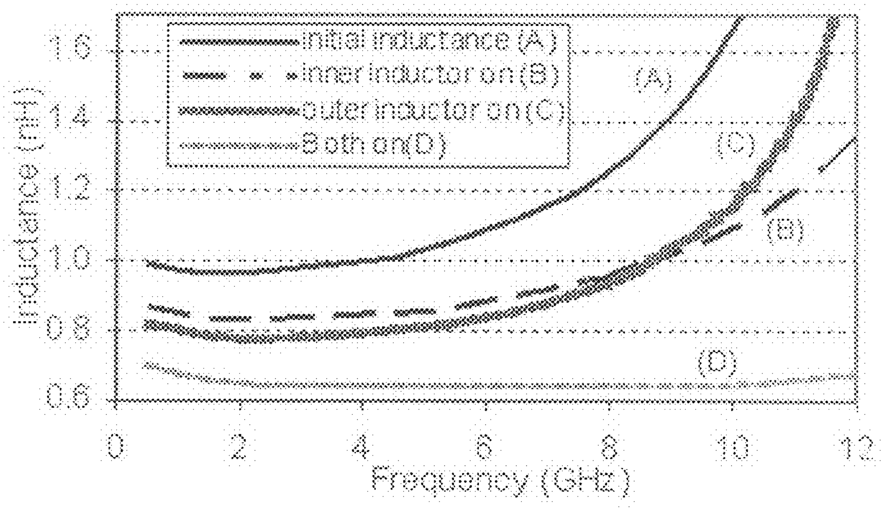
FIG. 6*a* and 6*b* are graphs that illustrate simulated inductance and Q of a switched tunable inductor on Avatrel™ membrane, respectively, showing a maximum tuning of 47.5% at 6 GHz.
Figure 6B:
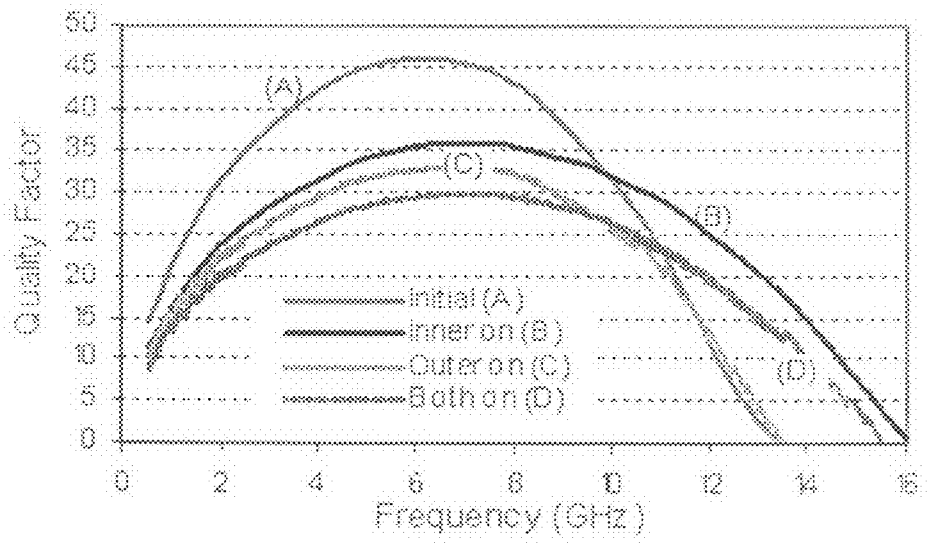

The tunable inductors 10 were simulated in the Sonnet electromagnetic tool. FIGS. 6*a* and 6*b* shows the simulated effective inductance and Q seen from port one at four states of the tunable inductor (State (A) is when all the switches are off). As shown in FIG. 6*a*, a maximum inductance change of 47% is expected at the frequency of the peak Q, when both switches are on. At low frequencies, $R_i$ is not negligible compared to $L_i\omega$ and, according to equation (6), the percent tuning is small. At higher frequencies, $L_i\omega \gg R_i$ and magnetic coupling is stronger. Therefore, the amount of tuning increases at higher frequencies. The outer inductor at Port 2 is larger in size than the inner inductor at Port 2, and its peak Q occurs at lower frequencies. As a result, the outer inductor has a larger effect on the effective inductance at lower frequencies. In contrast, the frequency of the peak Q for the inner inductor is higher. Thus, the inner inductor at Port 2 has a larger effect at this frequency range.

Measurement Results

Several switched tunable inductors 10 were fabricated and tested. On-wafer S-parameter measurements were carried out using an hp 8510C VNA and Cascade GSG microprobes. Pad parasitics were not de-embedded. Each switched tunable inductor 10 was tested several times to ensure repeatability of the measurements.

Figure 7:
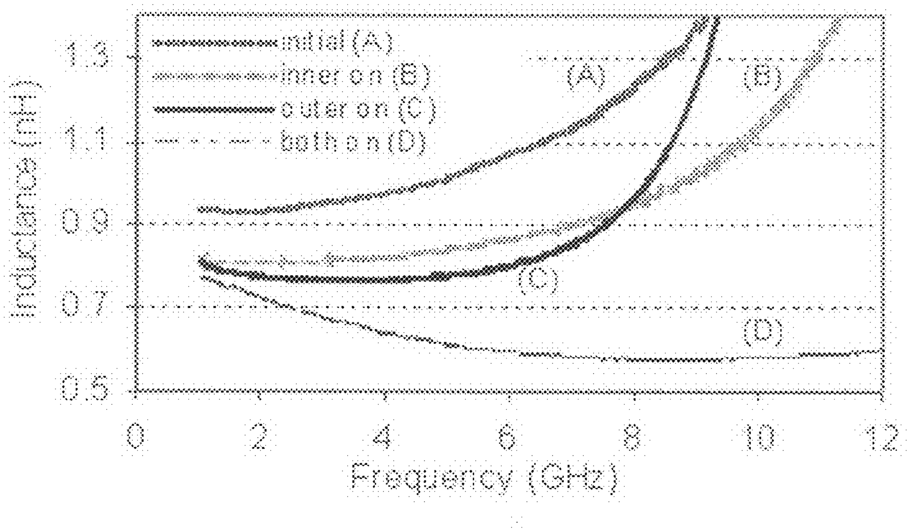
Figure 8:
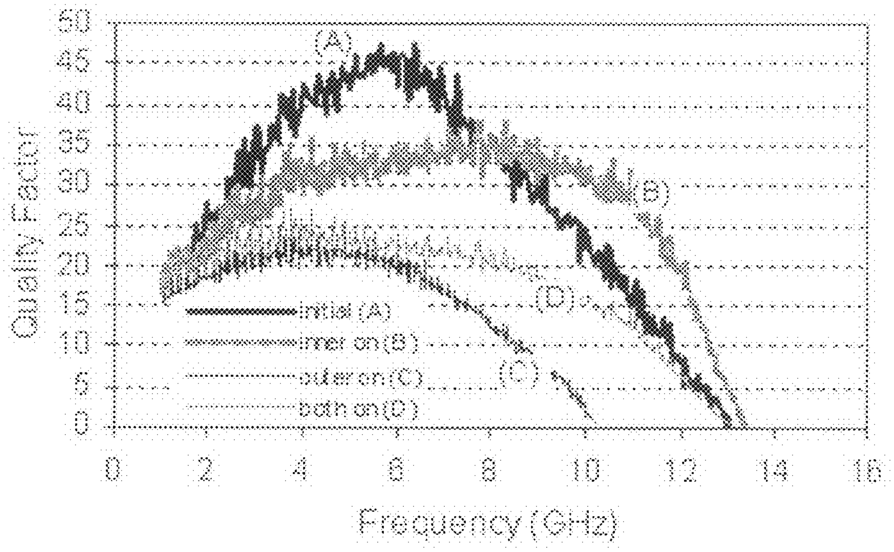
FIG. 8 illustrates measured embedded Q showing the Q drops as the inductor is tuned.
Figure 9:
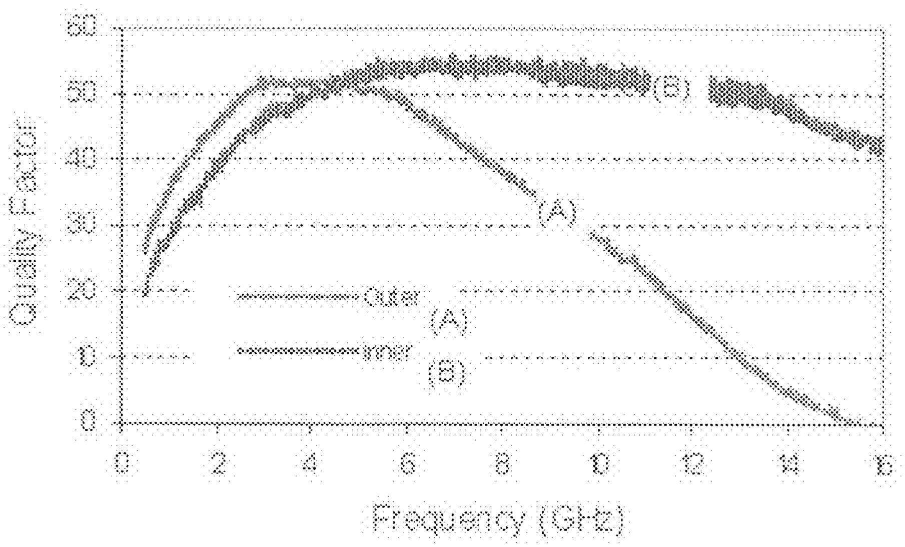
FIG. 9 illustrates measured Q of the inductors at port two on Avatrel™ membrane.

FIG. 7 shows the measured inductance of a switched silver inductor 10 fabricated on an Avatrel™ polymer membrane 12. The inductance is switched to four different values and is tuned from 1.1 nH at 6 GHz to 0.54 nH, which represents a maximum tuning of 47% at 6 GHz. The maximum tuning was achieved when both secondary inductors were switched on. At 6 GHz, the effective inductance drops to 0.79 nH when the outer inductor (the larger inductor at Port 2) is on, and 0.82 nH when the inner inductor (the smaller inductor at port 2) is on. The measured results are in good agreement with the simulated response as shown in FIGS. 6 and 7. The measured embedded Q of this inductor 10 in different states is shown in FIG. 8. As shown, the inductor 10 exhibits a peak Q of 45 when the inductors at port two are both off. The Q drops to 20 when both switches are on. The drop of Q is consistent with Equation (2). When any of the inductors at port two are switched on, $L_{eq}$ decreases while the effective resistance increases resulting in a drop in Q as the inductor 10 is tuned. FIG. 9 shows the measured Q of the inductors at port two. From FIG. 9, it can be seen that the peak Q of the inner inductor (smaller inductor at port 2) is at frequencies >7 GHz. Thus, the maximum change in the effective inductance resulting from switching on the inner inductor occurs (smaller inductor at port 2) at this frequency range (FIG. 7).

Effect of Q on Tuning

To demonstrate the effect of the quality factor on the tuning ratio of the switched tunable inductors 10, substantially identical devices were fabricated on different substrates 11. On sample A, inductors 10 were fabricated on a CMOS-grade silicon substrate 11 passivated with a 20 μm thick PECVD silicon dioxide layer. The silicon substrate 11 was removed from the backside of the primary and secondary inductors of sample B to enhance their Q, leaving behind a 20 μm thick silicon dioxide membrane beneath the inductors. Silicon dioxide has a higher loss tangent than Avatrel™ polymer 12, which results in a higher substrate loss. Therefore, the Q of inductors on a silicon dioxide membrane (sample B) is lower than that of inductors on an Avatrel™ polymer membrane 12 as shown in FIG. 8.

Figure 10A:
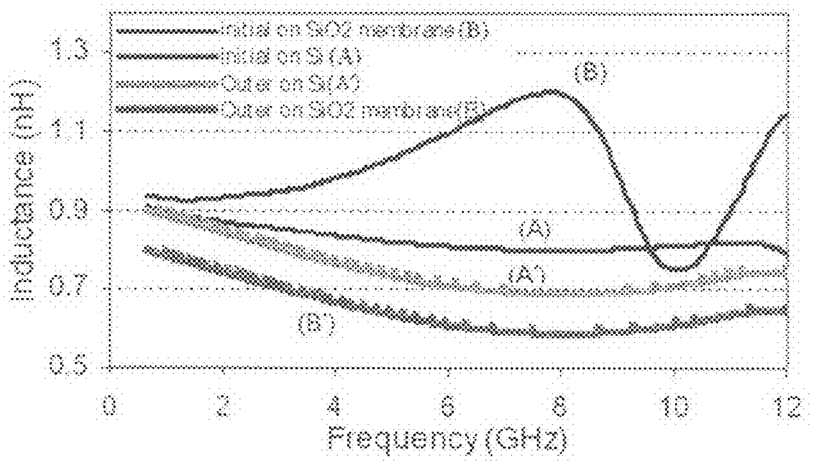
FIG. 10*a* and 10*b* illustrate measured inductance and embedded Q, respectively, of substantially identical tunable inductors fabricated on passivated silicon substrate (A), and 20 μm thick silicon dioxide membrane.
Figure 10B:
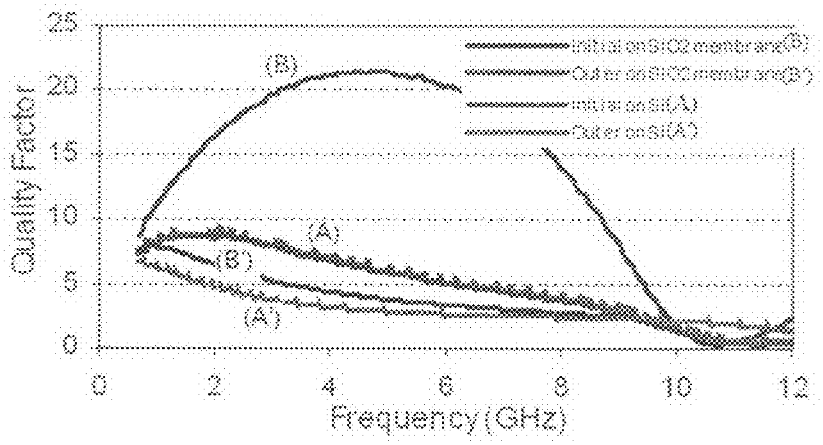

FIG. 10 compares the effective inductance and Q of the tunable inductors 10 on samples A and B at two different states. As shown in FIG. 10, the percent tuning is lower for sample A that has a lower Q. The inductance of sample A changes by 36.8% at 4.7 GHz when the outer inductor is switched on (State A'). At this frequency, the tuning resulting from switching on the outer inductor of sample B (State B') is only 9.7%. Consequently, employing low-loss materials such as Avatrel™ polymer helps improving the tuning characteristic of the switched tunable inductors 10.

The performance of the tunable inductors 10 may be further improved. The routing metal layer 14 of the fabricated inductors 10 is less than three times the skin depth of silver at low frequencies, where the metal loss is the dominant Q-limiting mechanism. Therefore, the quality factor (Q) of the switched tunable inductors 10 is limited by the metal loss of the routing metal layer 14 and can be improved by increasing the thickness of this layer 14.

Packaging Results

Hermetic or semi-hermetic sealing of silver microstructures increases the lifetime of the silver devices by decreasing its exposure to the corrosive gases and humidity. Silver is very sensitive to hydrogen sulfide ($H_2S$), which forms silver sulfide ($Ag_2S$), even at a very low concentration of corrosive gas. The decomposition of the contact surfaces leads to an increase of the surface resistance, hence, to a lower Q and for tunable inductors a lower tuning range. Another problem that impedes the wide use of silver is electrochemical migration which occurs in the presence of wet surface and applied bias. Silver migration usually occurs between adjacent conductors/electrodes, which leads to the formation of dendrites and finally results in an electrical short-circuit failure. The failure time is related to the relative humidity, temperature, and the strength of the electric field. For the structure of the tunable inductor 10 disclosed herein, a possible location of failure is between the switch pads only when the switch is in contact. When off, there is an air gap between the switch pads which blocks the path for the growth of dendrites.

Figure 11A:
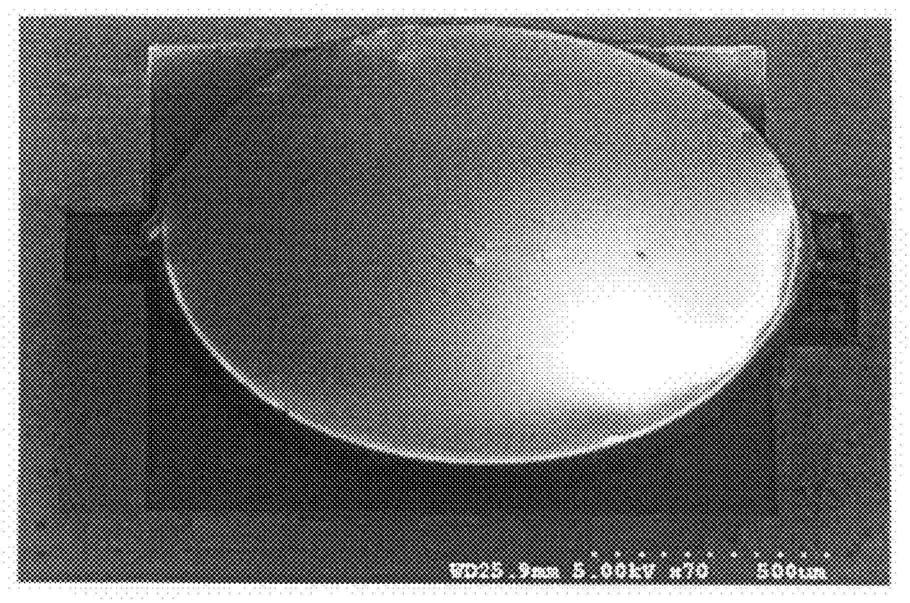
FIG. 11*a* is a SEM view of an exemplary packaged switched inductor and FIG. 11*b* is a close-up SEM view of a package showing the air cavity inside.
Figure 11B:
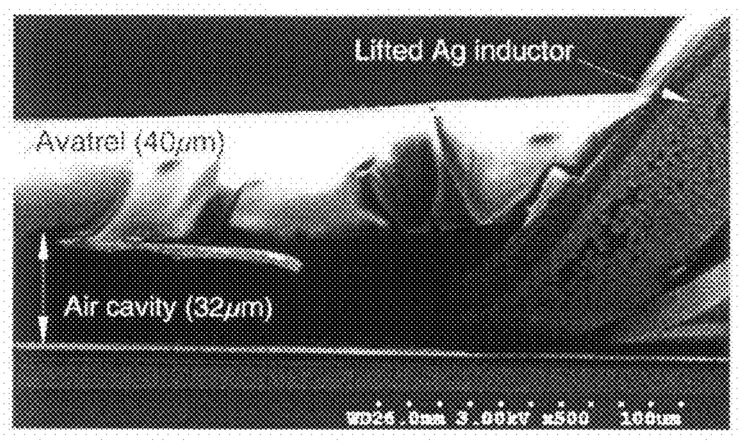

A semi-hermetic packaging technique may be used to prevent or lower their exposure to the corrosive gases, and to encapsulate the tunable inductor 10. If necessary, subsequent over-molding can provide additional strength and resilience, and ensures long-term hermeticity. FIG. 11*a* is a SEM view of the packaged switched tunable inductor 10 and a close-up view of a broken package is presented in FIG. 11*b* showing the air cavity 23 inside. The inductor trace was peeled during the cleaving process.

Figure 12:
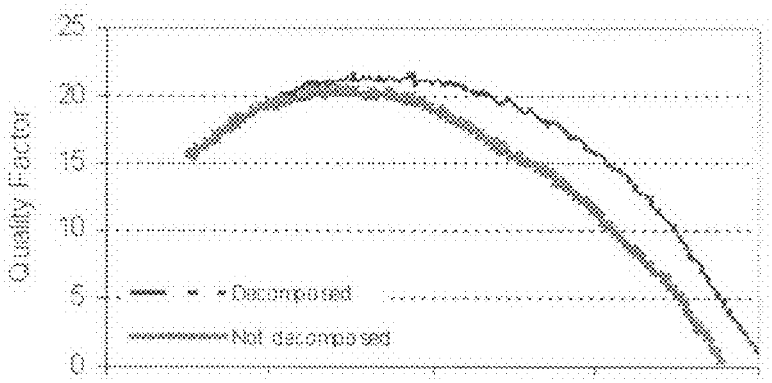
FIG. 12 illustrates measured embedded Q of two substantially identical inductors, before decomposition, one packaged and one un-packaged.
Figure 13:
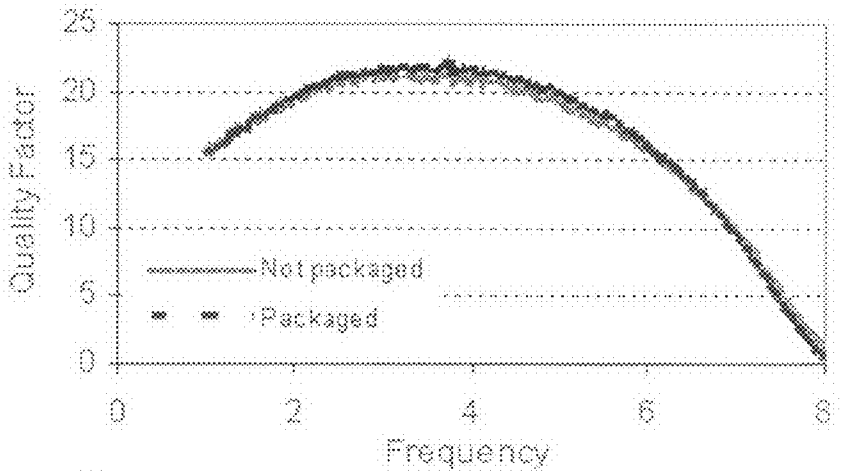
FIG. 13 illustrates measured embedded Q of two substantially identical inductors when both switches are off, one packaged and one un-packaged.
Figure 14:
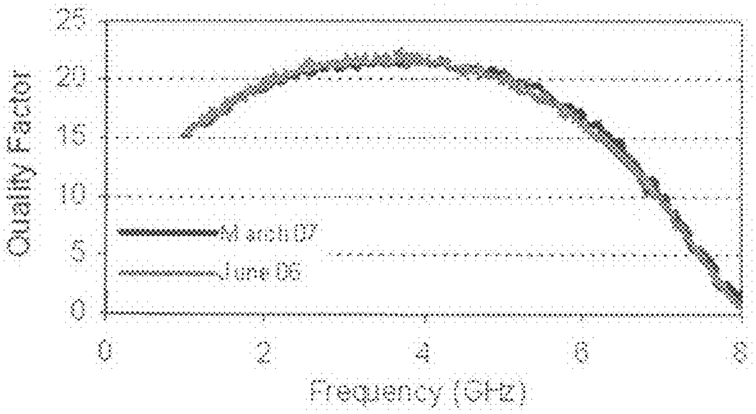
FIG. 14 illustrates measured embedded Q of the packaged silver tunable inductor, showing no degradation in Q after about 10 months.

FIG. 12 shows the Q of two identical inductors 10 before decomposition of the sacrificial polymer 21. The two inductors 10, one packaged and one un-packaged were fabricated on silicon nitride-passivated high-resistivity (ρ=1 kΩ-cm) silicon substrate 11. The un-decomposed packaged inductor 10 has a lower Q at higher frequencies because of the dielectric loss of the Unity® sacrificial polymer 21. When the Unity® sacrificial polymer 21 was decomposed and the packaging process was completed, the two inductors 10 were measured again. As shown in FIG. 13, the switched tunable inductor 10 showed no degradation in Q after packaging, indicating the Unity® sacrificial polymer 21 was fully decomposed. To demonstrate the effect of packaging on preserving the Q of the silver tunable inductor 10, the performance of the packaged inductor 10 was measured after ten months and is shown in FIG. 14. The performance of the packaged inductor 10 did not change during this time period.

Thus, improved microelectromechanical systems (MEMS) switched tunable inductors have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. A microelectromechanical tunable inductor apparatus comprising:
- a substrate;
- a dielectric layer disposed on the substrate;
- a first conductive layer disposed on the dielectric layer;
- a second conductive layer comprising:
  - a primary inductor;
  - a plurality of secondary inductors positioned in proximity to the primary inductor, the plurality of secondary inductors including a first secondary and a second secondary inductors, the primary inductor positioned between the first secondary and second secondary inductors; and
  - a plurality of micromechanical switches coupled to the plurality of secondary inductors, each switch having an actuation air gap, and wherein each switch is switched on and off to change the effective inductance of the primary inductor; and
- an outer protective member that contacts the dielectric layer and encapsulates the inductors and switches inside a cavity.

2. The apparatus recited in claim 1 wherein the substrate is selected from a group including silicon, CMOS, BiCMOS, gallium arsenide, indium phosphide, glass, ceramic, silicon carbide, sapphire, organic and polymer.

3. The apparatus recited in claim 1 wherein the dielectric layer is selected from a group including silicon dioxide, silicon nitride, hafnium dioxide, zirconium oxide and low-loss polymer.

4. The apparatus recited in claim 1 wherein the conductive layers are selected from a group including polysilicon, silver, gold, aluminum, nickel, and copper.

5. The apparatus recited in claim 1 wherein the outer protective member comprises a polymer.

6. The apparatus is claim 1 wherein the primary inductor and the secondary inductors are planar spiral inductors.

7. The apparatus in claim 1 wherein the primary inductor and the secondary inductors are out-of-plane solenoid inductors, wherein the out-of-plane solenoid inductors are not interwound.

8. The apparatus in claim 1 wherein the secondary inductors are multi-turn inductors.

9. The apparatus in claim 1 wherein the substrate comprises a cavity formed under the conductive layers to reduce the substrate loss.

10. The apparatus recited in claim 1 wherein the switches have an electrically isolated actuation port formed using the first conductive layer.

11. A microelectromechanical tunable inductor apparatus comprising:
- a substrate;
- a dielectric layer disposed on the substrate;
- a first conductive layer disposed on the dielectric layer forming a routing for inductors and first plates of a plurality of vertical micromechanical switches;
- a second conductive layer comprising:
  - a primary inductor;
  - a plurality of secondary inductors positioned in proximity to the primary inductor; and
  - second plates of the plurality of vertical micromechanical switches that are coupled to the plurality of secondary inductors by way of suspended conductive springs, each switch having an actuation air gap, and wherein each switch is switched on and off to change the effective inductance of the primary inductor; and
- an outer protective member that contacts the dielectric layer and encapsulates the inductors and switches inside a cavity.

12. The apparatus recited in claim 11 wherein the switches have an electrically isolated actuation port formed using the routing layer.

13. The apparatus recited in claim 1 wherein the switches are coupled to the secondary inductors by way of suspended conductive springs.

14. The apparatus recited in claim 11 wherein the substrate is silicon.

15. The apparatus recited in claim 11 wherein the conductive layers are silver.

16. The apparatus recited in claim 11 wherein the outer protective member comprises a polymer.

17. The apparatus in claim 11 wherein the primary inductor and the secondary inductors are planar spiral inductors.

18. The apparatus in claim 11 wherein the secondary inductors are multi-turn inductors.

19. The apparatus in claim 11 wherein the substrate comprises a cavity formed under the conductive layers to reduce the substrate loss.

20. The apparatus in claim 17, wherein the primary inductor and the secondary inductors are concentric.

21. The apparatus of claim 11, wherein the effective inductance of the primary winding depends upon the number of switches that are switched on.

22. The apparatus of claim 11 wherein the primary inductor and secondary inductors are out-of-plane solenoid inductors, wherein the out-of-plane solenoid inductors are not interwound.

* * * * *